United States Patent

[11] 3,575,203

| [72] | Inventor | Dwight N. Johnson |
| | | Anaheim, Calif. |
| [21] | Appl. No. | 717,790 |
| [22] | Filed | Apr. 1, 1968 |
| [45] | Patented | Apr. 20, 1971 |
| [73] | Assignee | The Singer Company |

[54] PRESSURE REGULATOR DEVICE
11 Claims, 6 Drawing Figs.

[52] U.S. Cl. .................................................... 137/484.8,
137/517
[51] Int. Cl. ..................................................... F16k 17/34,
F16k 15/14
[50] Field of Search............................................. 137/484.6,
484.8, 505.36, 505.47, 505.34, 505.35; 138/45;
137/525.3, 517

[56] References Cited
UNITED STATES PATENTS
| 2,732,859 | 1/1956 | Chase............................ | 137/517X |
| 2,960,109 | 11/1960 | Wilson ......................... | 137/517 |
| 1,589,243 | 6/1926 | Scott ................. | 251/Needle Valves UX |
| 3,209,780 | 10/1965 | Mercler......................... | 137/525.3X |

FOREIGN PATENTS
| 77,750 | 5/1960 | France ......................... | 137/517 |
| 847,514 | 9/1960 | Great Britain................ | 137/525.3 |

Primary Examiner—M. Cary Nelson
Assistant Examiner—Robert J. Miller
Attorney—Lyon and Lyon ABSTRACT: A fluid pressure regulator employs a flexible disc with a central passage, together with an axially movable nonresilient valve member in the passage to control flow through the passage as the disc flexes under changes in differential pressure. A coil torsion spring has a laterally projecting arm connected to the valve member and to a flexible diaphragm assembly responsive to pressure at the outlet of the regulator device. A pressure-sensitive limiter device cooperates with the valve member to control pressure reduction under the diaphragm assembly to a value below outlet pressure to make up for loss in reference spring force as the regulator strokes open.

PATENTED APR 20 1971

3,575,203

INVENTOR
DWIGHT N. JOHNSON
BY
Lyon & Lyon
ATTORNEYS

PRESSURE REGULATOR DEVICE

This invention relates to fluid pressure regulators, and in one aspect of this invention a deformable disc has a central orifice which changes in size as the disc flexes under varying differential pressures. While this general concept is disclosed in the U.S. Pat. 2,454,929 to Kempton, the present invention employs a nonresilient valve member extending into the orifice or passage and is provided with an external surface cooperating with an edge wall of the orifice to provide constant regulator capacity potential over a wide range of inlet pressures. In effect, the orifice contracts in a controlled manner around the valve member and minimizes the increase in closing force applied to the valve member by a rising inlet pressure.

In another aspect of the invention, the reference force tending to open the regulator valve is provided by an improved torsion spring and lever arm assembly. The lever arm is formed at one end of the torsion spring and is connected at its free end to a flexible diaphragm assembly which is responsive to pressure at the regulator outlet. The valve member is connected to the arm between the torsion spring and the diaphragm assembly, so that the arm amplifies the diaphragm force to the valve member.

In another aspect of the invention, means are provided for syphoning off pressure under the diaphragm assembly to a value below pressure at the outlet, to compensate for loss in reference spring force, as the regulator valve moves in an opening direction. The chamber below the diaphragm is syphoned off with flow and is backfilled by unseating of a flexible pressure-sensitive limiter device.

Figures 1, 2, 3, 4, 5, 6:
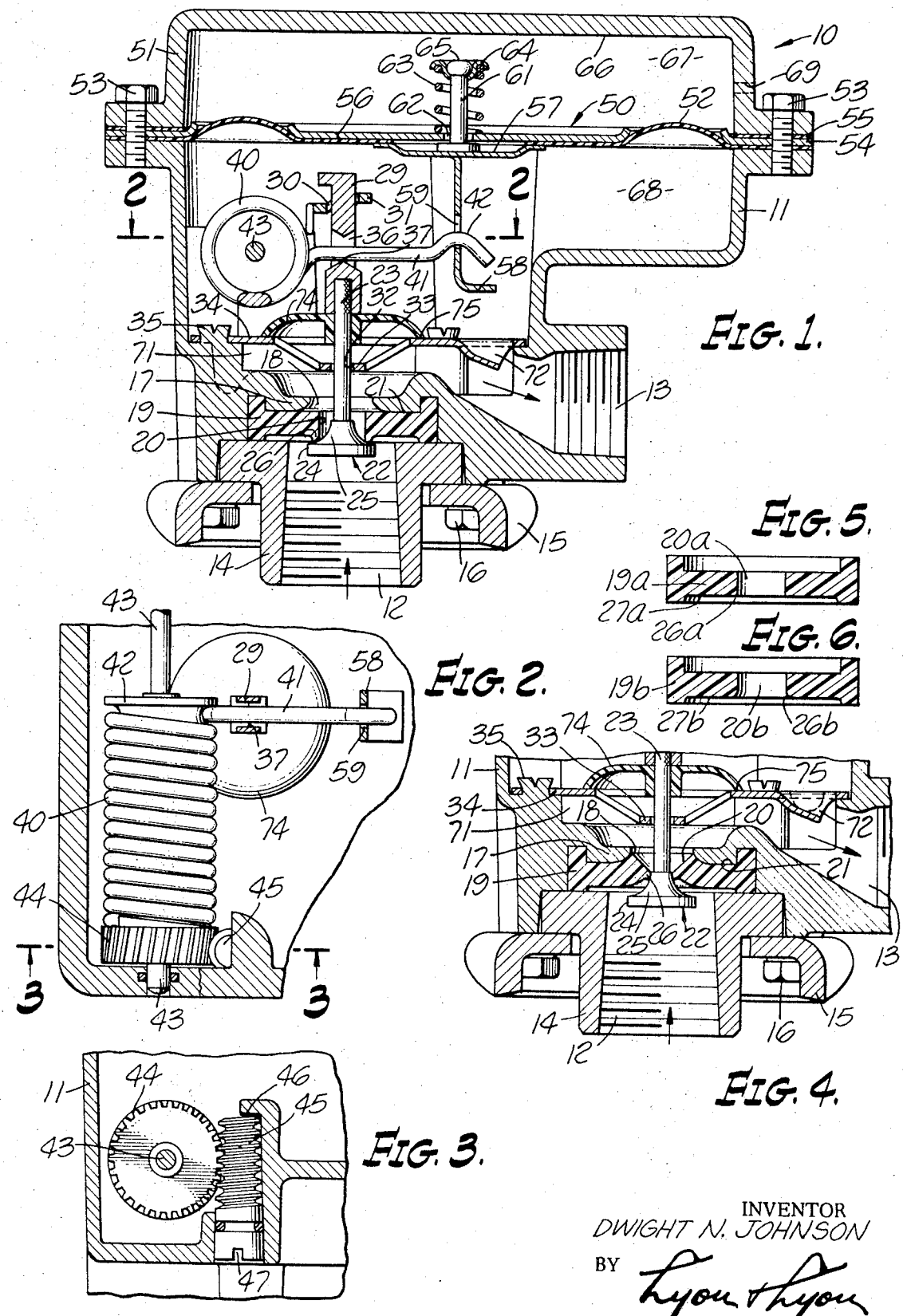
FIG. 1 is a sectional side elevation showing a preferred embodiment of this invention.
FIG. 2 is a sectional plan view, partly broken away, taken substantially on the lines 2–2 as shown on FIG. 1.
FIG. 3 is a sectional elevation, partly broken away, taken substantially on the lines 3–3 as shown on FIG. 2.
FIG. 4 shows a portion of the apparatus of FIG. 1, with certain of the parts moved to different positions.
FIG. 5 shows a modified form of flexible disc.
FIG. 6 shows a further modified form of flexible disc.

Referring to the drawings, a pressure regulator device generally designated 10 includes a stationary body or shell 11 provided with an inlet 12 and an outlet 13. In the particular form of the invention shown in the drawings, the inlet 12 is provided by a terminal fitting 14 clamped against the stationary body 11 by means of clamping member 15 and threaded fastenings 16.

The stationary body 11 is preferably formed of metal and includes an integral metal plate 17 provided with a central aperture 18. A flexible disc 19 formed of elastomeric material is mounted within the body 11 adjacent the plate 17, and is held in position by the inlet fitting 14. This flexible disc 19 has a central circular passage 20 of smaller diameter than the plate aperture 18. The material of the disc 19 is sufficiently flexible so that the central portion of the disc 19 in the region of the passage 20 may be deformed, as shown in FIG. 4, by increasing differential pressure between the inlet 12 and the outlet 13. The face 21 of the flexible disc 19 engages the apertured plate 17. A valve member 22 having a stem 23, a head 24, and an external tapering surface of revolution 25, extends through the plate aperture 18 and the passage 20 in the flexible disc 19. The lip 26 on the disc 19 at the upstream end of the passage 20 cooperates with the surface 25 on the valve member 22 to control flow of fluid through the passage 20 as the disc 19 flexes under changes in differential pressure between the inlet 12 and the outlet 13.

The lip 26 may constitute a projecting bead or rim as shown in FIGS. 1 and 4, or as shown in FIG. 5, the lip 26a may constitute the edge defining the intersection of the cylindrical passage 20a with the plane surface 27a of the flexible disc 19a. Also, as shown in FIG. 6, the lip 26b may constitute a curved transition surface adjoining the cylindrical passage 20b with the plane surface 27b on the flexible disc 19b. Whatever the precise shape of the lip 26, 26a, 26b, the lip cooperates with the external tapering surface of revolution 25 on the valve member 22 to provide a substantially constant regulator capacity potential over a wide range of inlet pressures. This cooperation between the lip 26 and the surface 25 also minimizes the increase in closing force applied to the valve member 22 by rising inlet pressure. As the lip 26 moves between the position shown in FIG. 1, corresponding to low-pressure differential between the inlet 12 and the outlet 13, to the position shown in FIG. 4, corresponding to a high-pressure differential, the central portion of the flexible disc 19 moves into the aperture 18 in the metal plate 17, distorting the central portion of the disc 19 and reducing the effective diameter of the lip 26.

The upper end of the valve stem 23 is fixed to an extension piece 29 which functions as an integral part of the valve member 22. This extension 29 is guided in an opening 30 in the stationary guide 31. Another guide is provided by the opening 32 which receives the valve stem 23 and which is provided in the central portion 33 of the barrier plate 34. This barrier plate 34 is fixed within the stationary body 11 by means of staked plugs 35.

The valve extension 29 is provided with a lateral opening 36 defined by tapered walls to provide a fulcrum edge 37. A coil torsion spring 40 is mounted within the body 11 and has an integral arm 41 which projects through the opening 36 and has an offset bend 42 adjacent its free end. The torsion spring 40 is supported at one end by a drum 42 mounted on shaft 43. Both ends of this shaft 43 are mounted on the body 11. The other end of the torsion spring 40 is mounted on a worm wheel 44 also carried by the shaft 43. The worm wheel 44 meshes with a worm pinion 45 mounted to turn within the body 11 and held against axial movement by means of the shoulder 46. A screwdriver slot 47 in the worm pinion 45 is accessible exteriorly of the body, so that the worm pinion 45 may be turned, thereby turning the worm wheel 44 and changing the force of the torsion spring 40.

A flexible diaphragm assembly generally designated 50 is mounted between the stationary body 11 and the body cover 51. This assembly 50 includes an annular flexible diaphragm 52 having its outer periphery clamped between flanges on the body 11 and cover 51 by means of threaded fastenings 53. Also clamped between these flanges are the annular metallic ring 54 and the gasket 55. A circular metal plate 56 overlies the central portion of the annular diaphragm 52. Another circular plate 57 underlies the inner portion of the flexible diaphragm 52 and this plate carries the central post 58 which has an aperture 59 receiving the offset bend 42 in the arm 41. The post 58 and circular plate 57 are connected to a rod 61 which projects through a central opening 62 in the diaphragm plate 56. A coil compression spring 63 rests against the diaphragm plate 56 at one end, and at the other end the spring engages a retainer 64 on the rod 61. The force of the spring 63 acts to clamp the inner periphery of the flexible diaphragm 52 between the circular plates 56 and 57. If the diaphragm assembly 50 should move beyond its normal travel in a direction toward the body cover 51, the end 65 of the rod 61 contacts the undersurface 66 of the cover 51 to limit upward travel of the post 58 and also to separate the plate 57 from the flexible diaphragm 52, and thereby establish bypass communication between the space 67 between the diaphragm assembly and the cover 51, and the space 68 on the other side of the diaphragm assembly within the body 11. This opening of a bypass passage between the space 67 and chamber 68 prevents possible damage to the flexible diaphragm 52, by equalizing the pressure on opposite sides thereof. The space 67 is vented to atmosphere through a small port diagrammatically shown at 69.

In operation, fluid under pressure is admitted through the inlet 12 and passes through the restriction formed between the flexible lip 26 and the surface 25 on the valve member 22. The fluid then passes through the opening 20 in the disc 19 and through the aperture 18 in the plate 17 and enters the space 71 within the body 11 and below the barrier plate 34. This space 71 communicates with the outlet 13. A laterally directed port 72 formed in the plate 34 adjacent the outlet 13 establishes communication between the chamber 68 and the outlet 13. The fluid pressure in the chamber 68 acting on the diaphragm assembly 50 causes it to apply an upward force to the arm 41 through the post 58. Another upward force caused by fluid pressure in the inlet 12 acting on the valve head 24 is applied to the arm 41 through the fulcrum edge 37. The torsion spring 40 acting on the integral arm 41 acts to move the arm in a clockwise direction as viewed in FIG. 1, so that both the diaphragm force and the valve force are resisted. An increase in pressure in the chamber 68 causes the diaphragm assembly 50 to lift the post 58 and arm 41 in opposition to the reference force of the spring 40, thereby permitting the valve member 22 to move upward slightly in the direction to reduce flow from the inlet 12. Conversely, a reduction in pressure in the chamber 68 reduces the force applied by the post 58 to the arm 41, and allows the spring 40 and arm 41 to move the valve member 22 in a direction to increase the flow from the inlet 12.

The contraction of the central passage in the flexible disc 19 caused by rising inlet pressure minimizes the increase in closing force applied by the valve member 22. An increase in closing force causes further deflection of the arm 41 with the diaphragm force (outlet pressure) remaining constant. The contour of the surface 25 matches the shift in both the position of the valve 22 and the position of the flexible lip 26 with changing inlet pressures.

The term "compound" is one used in this art to describe the syphoning off of pressure under the diaphragm of a regulator to a value below discharge pressure, to make up for loss in reference spring force as the regulator strokes in the opening direction. In accordance with this invention, means are provided to limit this "compound" effect as a function of stroke of the valve 22, thereby accurately matching the loss in force of the spring 40. As shown in the drawings, the "compound" limiter takes the form of a valve bonnet 74 formed of elastomeric material and mounted on the valve stem 23. The peripheral edge 75 of this valve bonnet 74 is adapted to rest on and seal against the upper surface of the stationary barrier plate 34. With the parts in the position shown in FIG. 1, the valve bonnet 74 is closed and pressure in the space 71 is the same as pressure at the outlet 13. The diaphragm chamber 68 is syphoned off with flow and is backfilled by unseating of the bonnet 74. The position and shape of the port 72 is designed to be as effective as possible, even at low rates of flow. The compound limiter bonnet 74 regulates the actual amount of syphon or compound realized by backfilling, and neutralizes excess syphon action when outlet pressure exceeds the pressure in the diaphragm chamber 68 by an amount sufficient to unseat the bonnet 74. The compound limiter bonnet offers substantially no backflow restriction at lockup to set flow, but gradually creates the required differential, as the regulator strokes open, to compensate for loss in the spring force.

Having fully described my invention, it is to be understood that I am not to be limited to the details herein set forth but that my invention is of the full scope of the appended claims.

I claim:

1. In a fluid pressure regulator device, the combination of: a stationary body provided with an inlet and an outlet, a flexible disc operatively positioned within the body between the inlet and the outlet, the disc having a central circular passage extending therethrough and having a lip at the upstream end of said passage, a nonresilient valve member mounted in the body for axial movement and extending through said passage, said member having an external tapering surface of revolution cooperating with said lip to control flow through the passage as the disc flexes under increasing differential pressure between said inlet and outlet, and means on the body responsive to pressure at the outlet for moving said valve member axially.

2. The combination set forth in claim 1 in which a nonresilient plate on the body contacts a face of the disc remote from said lip and is provided with a central aperture of larger diameter than the disc passage.

3. In a fluid pressure regulator device, the combination of: a stationary body provided with an inlet and an outlet, a stationary plate within the body having a central aperture, a flexible disc having a face engaging said plate and having a central circular passage extending therethrough, the disc having a lip at one end of said passage remote from said face, said plate aperture being larger than said disc passage to permit flexing of a central portion of said disc, a nonresilient valve member extending through said passage and having an external tapering surface of revolution cooperating with said lip to control flow through the passage as the disc flexes under changes in differential pressure between said inlet and outlet, and means on the body responsive to pressure at the outlet for moving said valve member axially.

4. The combination set forth in claim 3 in which said valve member has a head portion exposed to inlet pressure and a stem portion exposed to outlet pressure, spring means connected to the stem portion to move the valve member axially in one direction, and means on the body responsive to outlet pressure and operatively connected to the stem portion for moving the valve member in the other direction.

5. In a fluid pressure regulator device, the combination of: a stationary body provided with an inlet and an outlet, a stationary plate within the body having a central aperture, a flexible disc having a face engaging said plate and having a central circular passage extending therethrough, the disc having a lip at one end of said passage remote from said face, said plate aperture being larger than said disc passage to permit flexing of a central portion of said disc, a nonresilient valve member extending through said passage and having an external tapering surface of revolution cooperating with said lip to control flow through the passage as the disc flexes, a lever pivotally engaging the stem portion, spring means acting to move the lever in one direction, and means on the body responsive to outlet pressure acting to move the lever in the other direction.

6. In a fluid pressure regulator device, the combination of: a stationary body provided with an inlet and an outlet, a flexible disc operatively positioned within the body between the inlet and the outlet, the disc having a central circular passage extending therethrough and having a lip at the upstream end of said passage, a nonresilient valve member extending into said passage and having an external tapering surface of revolution cooperating with said lip to control flow through the passage as the disc flexes under changes in differential pressure between said inlet and outlet, a torsion spring in the body having a laterally projecting arm at one end, means on the body responsive to outlet pressure acting on the arm in opposition to the force of the spring, and means connecting the arm to move said valve member.

7. The combination set forth in claim 6 in which the pressure-responsive means acts on the free end of the arm, and wherein the connecting means is located between the ends of the arm.

8. In a fluid pressure regulator device, the combination of: a stationary body provided with an inlet and an outlet, valve means within the body controlling flow of fluid from the inlet to the outlet, said means including a movable valve member, a torsion coil spring in the body having an integral laterally projecting arm at one end, means on the body responsive to outlet pressure acting on the arm at a location remote from the torsion spring in opposition to the force of the spring, and means located between the ends of the arm connecting it to move said valve member.

9. The combination set forth in claim 8 in which the pressure-responsive means includes a flexible diaphragm assembly having a central movable element connected to the arm.

10. The combination set forth in claim 8 in which a worm and pinion gear assembly is provided on the body to turn an end of the torsion spring remote from the arm, for adjusting the force applied by the spring through the arm.

11. In a fluid pressure regulator device, the combination of: a stationary body provided with an inlet and an outlet, valve means within the body controlling the flow of fluid from the inlet to the outlet, said means including a movable valve member, a barrier plate in the body defining a space communicating with the outlet, a flexible diaphragm assembly cooperating with the body and barrier plate to define a chamber, the barrier plate having a passage connecting the space to said chamber, means on the barrier plate adjacent the outlet defining a port establishing communication between said chamber and the outlet, spring means operatively connected to move the valve member toward open position, means connecting the flexible diaphragm assembly to move the valve member in the other direction in opposition to the force of the spring, and compound limiter means including an element on the valve member normally closing said passage and acting to open the passage when the outlet pressure exceeds the pressure in the chamber by a predetermined amount.